United States Patent [19]

Downs

[11] Patent Number: 4,754,381
[45] Date of Patent: Jun. 28, 1988

[54] ELLIPSOIDAL REFLECTOR CONCENTRATION OF ENERGY SYSTEM

[76] Inventor: James W. Downs, 3846 Dunford Way, Santa Clara, Calif. 95051

[21] Appl. No.: 68,811

[22] Filed: Jun. 26, 1987

Related U.S. Application Data

[63] Continuation of Ser. No. 815,521, Jan. 2, 1986, abandoned.

[51] Int. Cl.$^4$ .............................. F21V 7/00; F24J 3/02
[52] U.S. Cl. .................................... 362/297; 350/612; 350/620
[58] Field of Search ................. 362/292, 297; 350/612, 350/613, 618, 619, 620, 602, 629

[56] References Cited

U.S. PATENT DOCUMENTS

| | | | |
|---|---|---|---|
| 2,703,506 | 3/1955 | Kelly | 350/620 |
| 3,805,052 | 4/1974 | Rambaurke | 350/620 |
| 3,887,263 | 6/1975 | Thompson | 350/620 |
| 4,054,364 | 10/1977 | Webster | 350/620 |
| 4,089,047 | 5/1978 | Lüderitz | 362/297 |
| 4,101,195 | 7/1978 | Korsch | 350/620 |
| 4,240,707 | 12/1980 | Wetherell et al. | 350/620 |
| 4,320,442 | 3/1982 | McCamy | 350/612 |
| 4,344,111 | 8/1982 | Rund et al. | 362/297 |
| 4,539,628 | 9/1985 | Bartenbach | 362/297 |

Primary Examiner—Raymond A. Nelli
Attorney, Agent, or Firm—Warren H. Kintzinger

[57] ABSTRACT

An ellipsoidal reflector system concentrating energy utilizing two effects—one being that light passing through one focus of an ellipse will tend to line up with the major axis after each reflection, combined with the other in the properties of ellipses rotated off-axis having one distributed focus and one point focus. After a few reflections light having originally passed through one focus is, for practical purposes, running along the major axis even though the major axis is approached as an asymptote. This energy concentration system would be quite useful as a source of highly collimated light such as would be more practical for field surveying work than, for example, lasers, for optical alignment, and fiber-optic carrier media input. In addition to light some of these ellipsoidal reflector systems for concentration of energy are also effective for ultrasonics and/or shock waves.

13 Claims, 4 Drawing Sheets

ELLIPSOIDAL REFLECTOR CONCENTRATION OF ENERGY SYSTEM

This application is a continuation of application Ser. No. 815,521, filed Jan. 2, 1986, now abandoned.

This invention relates in general to the concentration of energy, and more particularly, to ellipsoidal reflector energy directing and concentrating systems.

Concentration of reflected energy has encountered many problems in systems employed in the past with efficiency being one of the problems. Excessive expense has also been a problem and particularly so with laser systems. While laser beams have been used in surveying, optical alignment and other uses it is important to produce narrow light beams neither coherent nor monochromatic. It is important that these light beams be quite suitable and safer in use for surveying, optical alignment, and fiber-optic inputs with advantages also found in decrease bulk, power requirements and cost.

It is therefore a principal object of this invention to provide an inexpensive reliable system for concentrating energy.

Another object is to provide an ellipsoidal reflector system for the concentration of light, ultrasonics or shock waves.

A further object is to provide such a reflector system of decreased bulk, power requirements and cost.

Still another object is to provide such a reflector system concentrating light that is neither coherent or monochromatic concentrated to a narrow beam quite suitable for surveying, optical alignment, and fiber-optic inputs.

Another object is to provide such a reflector system concentrating light that is neither coherent nor monochromatic to a narrow beam easier and safer to use than a laser beam and with efficiency much greater than that of a laser.

A further object is to provide such a reflector system concentrating shock energy as a signal for special explosive shock energy uses.

Features of the invention useful in accomplishing the above objects include, in an ellipsoidal reflector concentration of energy system, utilization of two effects. First, that light passing through one focus of an ellipse will tend to line up with the major axis of the ellipsoidal reflector system after each reflection. Second, the first effect is combined with the properties of ellipses rotated off-axis having one distributed focus and one point focus. This system is quite suitable for use as a source of highly collimated light more practical for surveying field work than lasers.

Specific embodiments representing what are presently regarded as the best modes of carrying out the invention are illustrated in the accompanying drawings.

In the drawings:

FIG. 1 represents diagrammatically an ellipse rotated about a line passed perpendicularly through the ellipse major axis at one of the two focuses of the ellipse;

FIG. 2A, a diagrammatic showing of ultrasonic or explosive energy (explosive wires, etc.) source placed along the ellipse distributed focus with such energy leaving perpendicular to the source to strike the surface of the ellipsoid in the proper direction to be reflected to the second focus;

FIG. 2B, a diagrammatic showing of the behaviour of light energy emanating from points along a filament or gas-discharge tube with light radiating its energy in all directions;

FIG. 3, an ellipsoidal reflector formed by passing the axis of rotation through one focus but missing the other with a distributed focus at one end and a point focus at the other end;

FIG. 4, a combination of three ellipses rotated off axis having three distributed foci and sharing a common point focus;

Figure 3:
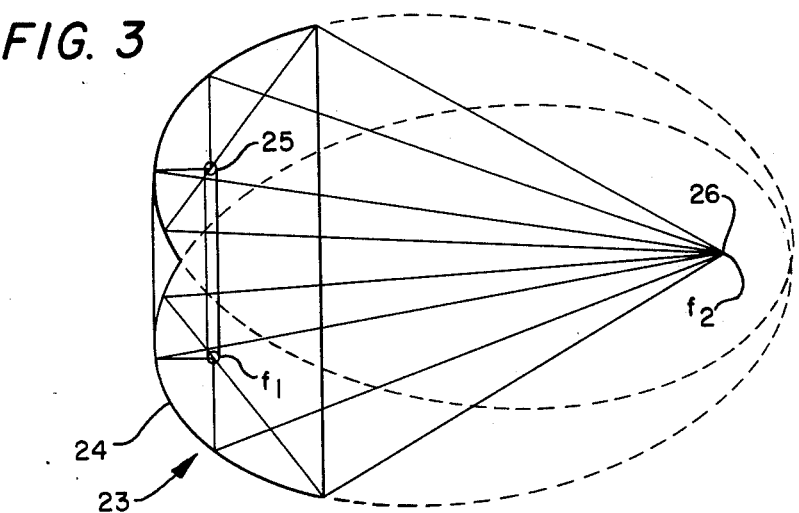
Figure 7:
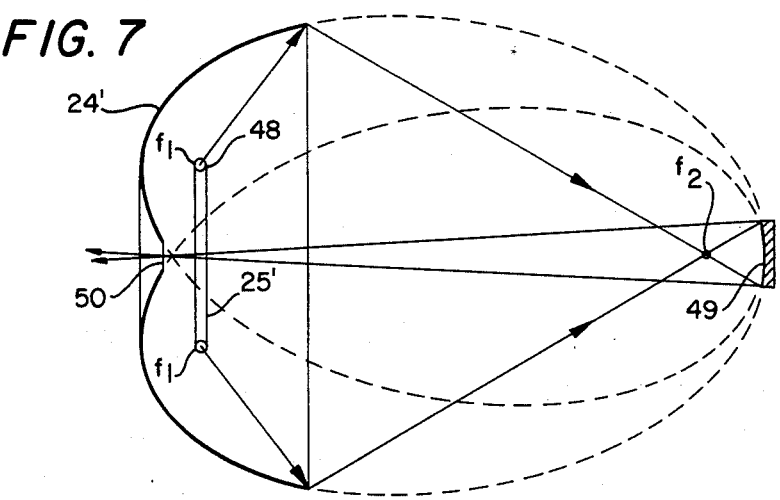
Figure 8:
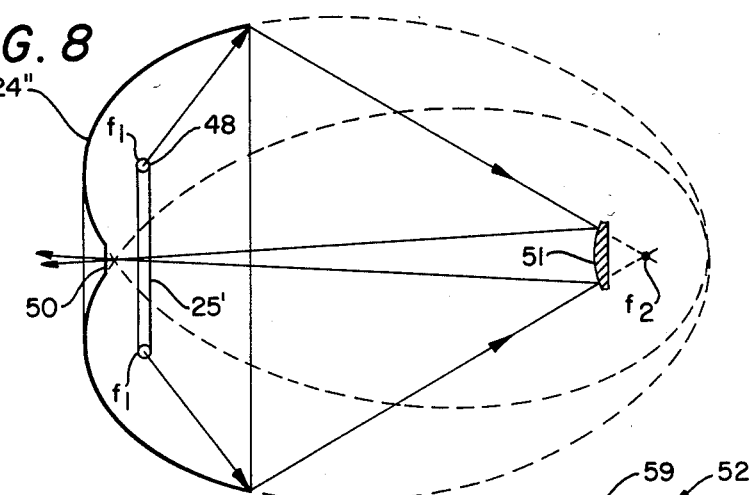
Figure 9:
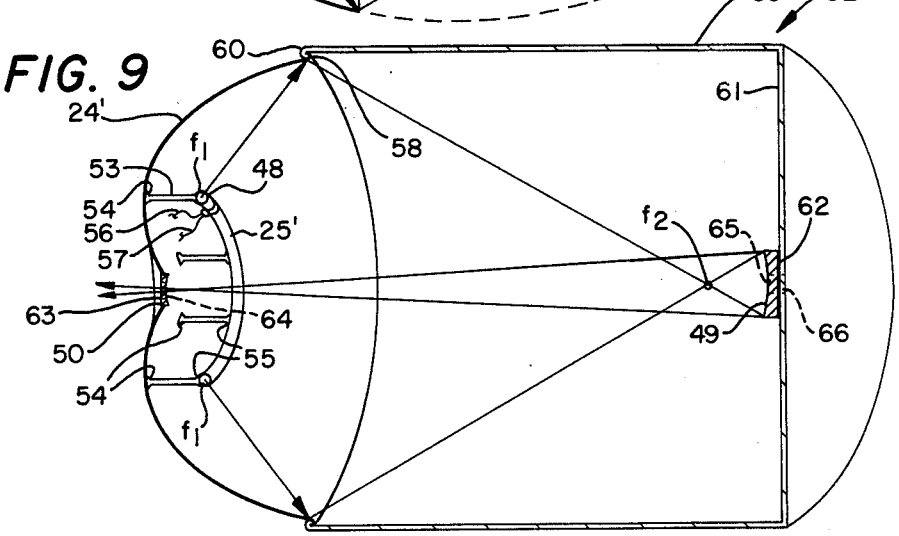

FIG. 7, a side diagrammatic view of a distributed focus ellipsoidal reflector like that of FIG. 3, with a circular gas discharge flash tube on the distributed focus with energy therefrom reflected to the point focus and on to a second ellipsoidal refector confocal therewith;

FIG. 8, a Cassegrain shortened version of the compound reflective system from the system of FIG. 7; and FIG. 9, a view like that of FIG. 7 with some structure detail added.

Figure 1:
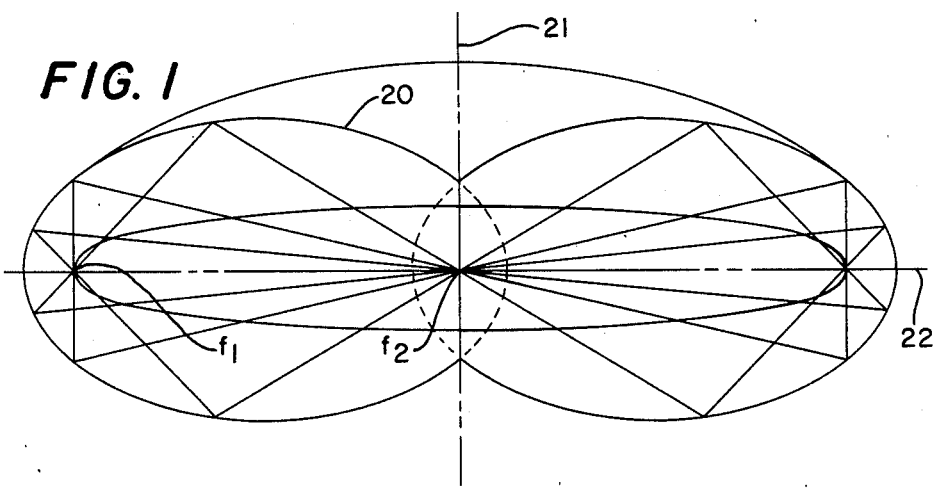
Figure 2A:
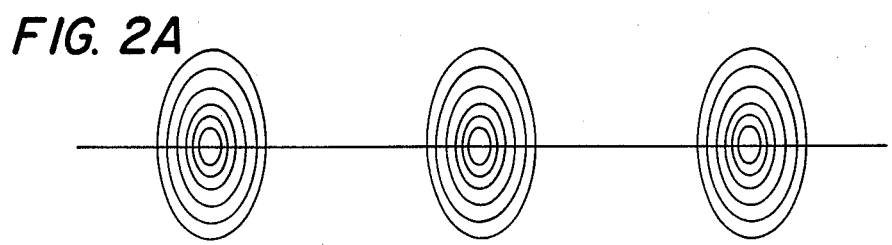
Figure 2B:
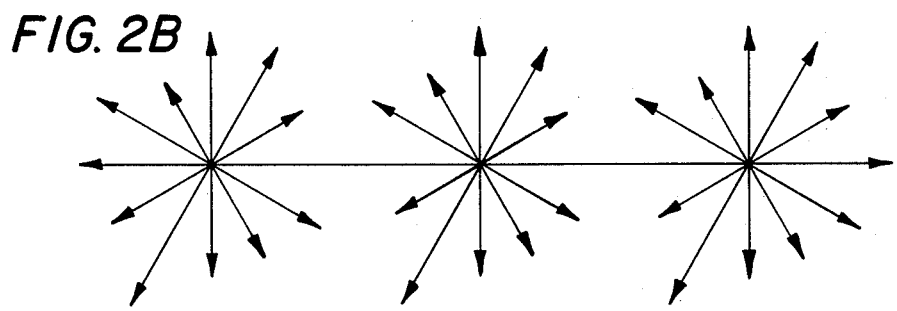

Referring to the drawings:

The ellipse 20 is rotated about a line 21 passed perpendicularly through the ellipse major axis 22 at the second focus f2 with the first focus f1 now a distributed focus in the form of a circle. This results in FIG. 1 resembling a sofa cushion having one focus f1 distributed as a circle while the other remains a point focus f2 with the laws of elliptical reflection remaining in effect for this figure. This works well with ultrasonic and explosive energy (explosive wires, etc.) that may be placed along distributed focus f1. Such energy leaving generally perpendicular to the source, as indicated in FIG. 2A, will strike the surface of the ellipsoid in the proper attitude to be reflected to the second focus. Unfortunately light energy is not so well disciplined and each point along a filament or gas-discharge tube radiates its energy in all directions as shown in FIG. 2B. This introduces a large axial error for much of the energy when trying to use such a source of light. However, an experimental model using a five inch diameter gas-discharge tube has been used to concentrate an impressive amount of energy at the point focus.

Even if it were possible to concentrate all of the light energy from such a source, there is an immutable law of nature that will not permit the temperature of an image of incoherent light to exceed the temperature of the source. (Laser light, being coherent, is not bounded by this law and may reach temperatures high enough to bring about atomic fusion.)

An ellipsoidal reflective system 23 may be provided as shown in FIG. 3 with the ellipsoidal reflector 24 formed by passing the axis of rotation through one focus but missing the other with a distributed focus 25 f1 at one end and a point focus 26 f2 at the other end. With the FIG. 3 ellipsoidal reflective system 23 the converging will be conical as it approaches the second focus (i.e. point focus 26).

Figure 4:
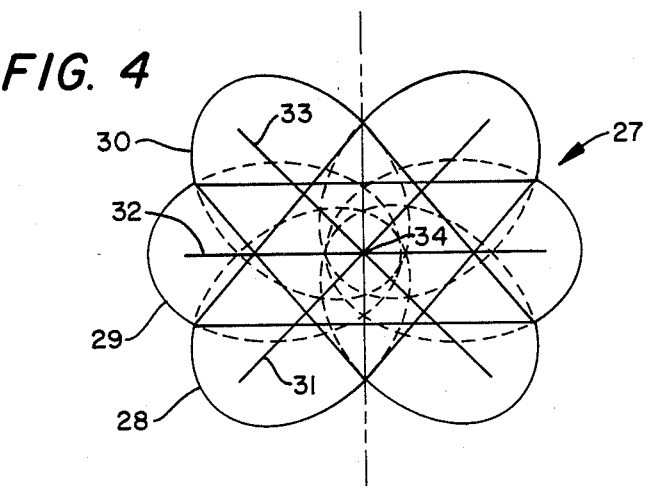

With the ellipsoidal reflective system 27 of FIG. 4 a combination of three ellipsoids, 28, 29 and 30 are rotated off-axis having three distributed foci 31, 32 and 33 all sharing a common point focus 34. The importance of ellipsoids rotated off-axis is that energy is taken from a finite (distributed) source and concentrated to a point while conventional ellipsoids are limited to reflective energy from one point to another. With conventional ellipsoids the size of the source must be small to keep the image size small at the second focus, and, in such a system, the concentration of energy is close to the same at both focal points.

Figure 5:
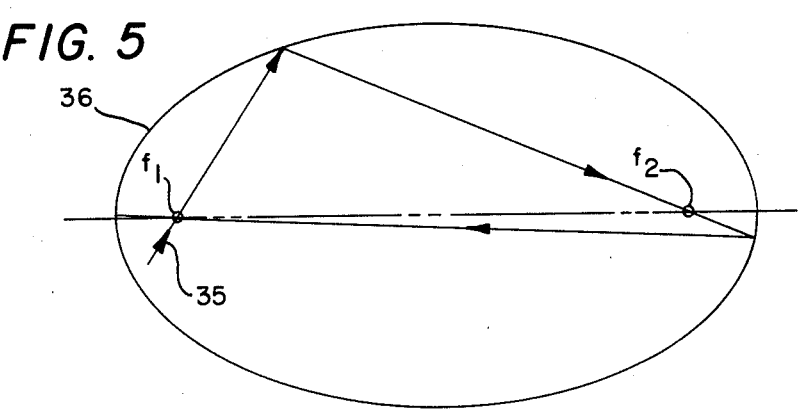
FIG. 5, illustrates a reflective property of ellipses with multiple reflections within an ellipse where a ray of energy passing through a focus reflects from the surface of the ellipse and pass through the focus with this process, theoretically going on forever with, however, after each reflection the path more nearly aligned with the major axis.

Multiple reflectors within an ellipse is an interesting phenomenon in that when a ray of energy passes through a focus it will reflect from the inner surface of the ellipse and pass through the other focus. Referring also to FIG. 5 the internal reflective process will, theoretically, go on forever, but with, after each reflection the ray path being more nearly aligned with the major axis. In practice, as shown, starting from point 34, the energy ray passes through focal point f1 of the ellipse 36 and then as reflected through focal point f2 and reflected again back through focal point f1 with after two or three passes the energy path traveling very nearly along the major axis. A problem with multiple ellipsoidal reflection systems is that a source of energy located at one focus will be in the path of energy after the second reflection. If multiple reflections with an ellipsoidal reflector are to be utilized there must not be substance at either focus.

In overcoming this problem an energy source may be positioned to the side from the ellipsoidal axis running through both focus points with energy from the energy source injected to converge at one focus so that with no physical obstruction at this focus nor at the other focus multiple reflections may occur. Many methods of energy ray concentration are feasible with the only requirement being that the energy must converge on one focus. With the ellipsoidal system 37 of FIG. 6A an energy source 38 generates energy radiation focused through lens 39 to ellipsoidal point focus f1 since it is thereby confocal with the main ellipsoid 40. In this instance the main ellipsoid 40 is comprised of two ellipsoid reflective sections 41 adjacent point focus f1 and 42 adjacent point focus f2 with both curved to match portions of a common ellipsoid. The internally reflective ellipsoid section 41 is shown to encompass an end of the shape of ellipsoid 40, have a small end opening 43 to permit passage of a narrow beam of energy outward from the ellipsoidal system 37, and also opposite end reflective section 42 that reflects energy beams back through point focus f1 to pass through small end opening 43. Note that a cut out 44 is provided in ellipsoid reflective section 41 to permit passage of focused energy beams passed through lens 39 to pass to and through point focus f1.

Figure 6A:
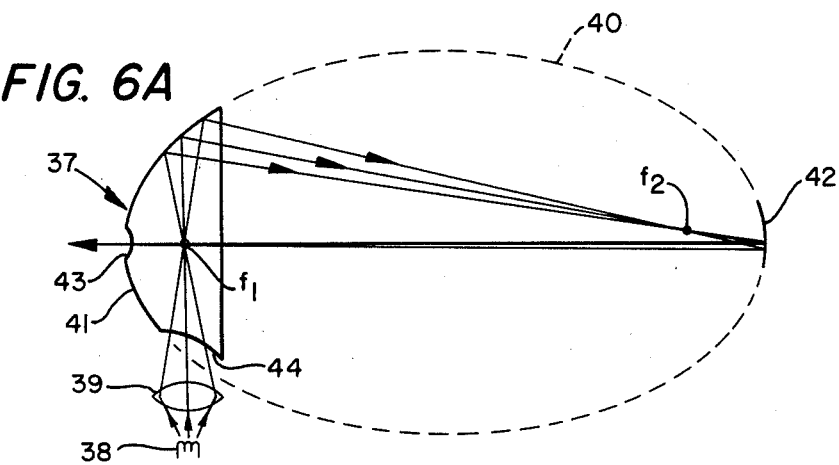
FIG. 6A, shows an external energy source emanating through a lens confocal with a focal point of the main ellipsoid.
Figure 6B:
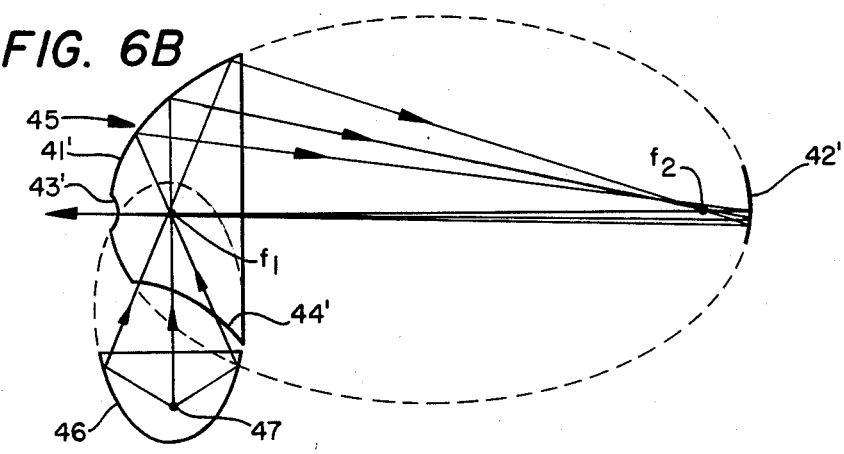
FIG. 6B, shows an external energy source emanating from an ellipsoidal reflector confocal with a focal point at the main ellipsoid.

The ellipsoidal system 45 of FIG. 6B is quite similar to the ellipsoidal system 37 of FIG. 6A with, however, the energy source 38 and lens 39 replaced by an ellipsoidal reflector 46 confocal with the main ellipsoid 40' and with an energy source 47 at a focal point within the ellipsoidal reflector 46. Primed numbers are used for portions of the ellipsoidal system 45 duplicating portions of the ellipsoidal system 37 where the function is the same.

Figure 6C:
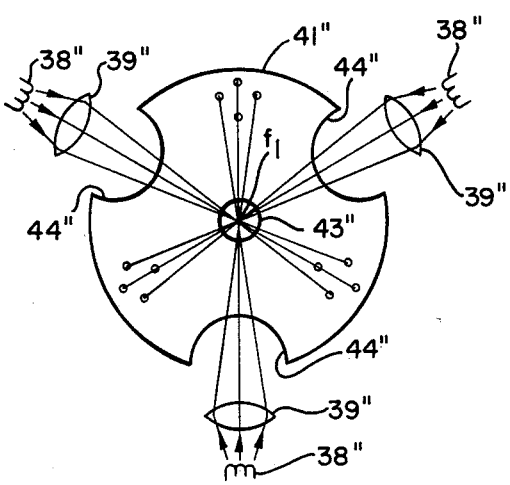
FIG. 6C, shows a major axis plan view of an ellipsoidal reflector with three external energy sources emanating through three lens confocal with a focal point of the main ellipsoid.

Referring also to FIG. 6C a major axis view shows an ellipsoidal reflective section 41" from the inside looking along the major axis of the main ellipsoid. In this instance three energy sources 38" generate energy radiation focused through three lens 39" to and through ellipsoidal point focus f1. Three cut outs 44" permit passage of energy radiation focused by lens 39" to the interior of the ellipsoidal reflective section 41" that is also provided with small end openings 43" to permit passage of a narrow beam of energy outward from the ellipsoidal system. It should be noted that the ellipsoidal reflective section 41" of FIG. 6C with three cut outs 44" could be used with three ellipsoidal reflectors 46 with three energy sources 47 such as shown in FIG. 6B, confocal with f1 of the main ellipsoid in place of the three lens 39" and energy sources 38" of the FIG. 6C showing. It should be noted with respect to FIGS. 6A, 6B and 6C that one way reflective mirror sections that reflect on the inside and pass radiated energy on through from the outside to the inside could be used in place of cut outs 44, 44' and 44" with it then possible to have energy directing devices directly opposite of each other rather than having to be spaced such as in FIG. 6C. It would be possible to use an annular rotated secondary ellipsoidal reflector projecting radiated energy into the primary reflector through an entire 360° circle via a band of one way reflective material as part of the primary reflector.

The ellipsoidal reflector system of FIG. 7 uses a distributed focus ellipsoidal reflector 24' like that of FIG. 3 with a circular gas discharge flash tube 48 of small tube diameter on the distributed focus 25' with energy therefrom reflected to the point focus f2 and on to a second ellipsoidal reflector 49 confocal therewith. With reflections again from the other end of the ellipsoidal system the angle of divergence further decreased until a nearly parallel beam emerges from a small hole 50 in one of the reflectors 24' or 49. In the showing of FIG. 7 the small hole 50 is provided on the major axis in the end of reflector 24'. In practice it is not practial to make too many passes since energy not passing through a system focus the first time has a tendency to go further afield with each pass. If a ray of energy misses a focus on the first pass it can never cross either focus no matter how many passes it makes. It is possible for a specially shaped curve reflector to coerce some stray rays to cross the second focus of an ellipsoidal system even though they missed the first focus slightly.

Where it is desired to shorten the length of an ellipsoidal system from that of FIG. 7 a hyperboloid reflector 51 may be used as the secondary reflector in a Cassegrain version of the compound reflective system as shown in FIG. 8. The distributed focus ellipsoidal reflector 24" in this instance is the same as with embodiment of FIG. 7 and the distributed focus f1 is also the same. Generally the rules of reflection discussed hereinbefore are again applicable, including multiple reflections, even with respect to placement of a confocal ellipsoidal reflector, or reflectors, at the exit end reflector of the reflective system. With this embodiment energy rays reflected from the distributed focus ellipsoidal reflector 24" toward the point focus f2 are intercepted in front of point focus f2 by the hyperboloid reflector 51 and reflected back generally along the system primary axis with much of this reflected energy radiation passing out through the small exit opening 50 in the form of a relatively narrow radiated energy beam. This narrow radiated energy beam as an output is neither coherent nor monochromatic, but there are many applications such as surveying, optical alignment, and fiber-optic input where these attributes are not required. Advantages are found in decreased equipment bulk and weight, lower power requirements, and less cost.

The ellipsoidal reflector system 52 of FIG. 9 is basically the same as the system of FIG. 7 with additional detail so, as a matter of convenience, those components the same or substantially the same carry the same identification numbers. The distributed focus ellipsoidal reflector 24' is a relatively stiff turned member to insure that its ellipsoid shape be preserved during use. The reflector 24' is shown to support illumination tube 48 that is of small diameter although the diameter of the distributed focus 25' may be, in some instances, substantial with spaced pedestals 53 that are fastened to the inner base of reflector 24' as by weldments 54, or other adhesive connections, and by adhesive connections 55 to the tube 48. Illumination tube 48, that may be a circular gas discharge flash tube, is sized and positioned to be coexistent with distributed focus 25' and is provided with electric power leads 56 and 57 that extend from a power source, not shown, for controlled supply of power to the illumination tube 48. The reflector 24' is provided with a turned over outer rim 58 to which cylindrical enclosure 59 is fastened at one end 60 by any of a number of conventional fastening techniques. The enclosure 59 also serves, via its end wall 61, as a mount with adhesive 62 for the second ellipsoidal reflector 49 in position to be confocal with the distributed focus ellipsoidal reflector 24'. The small hole 50 in reflector 24' is closed with a pane 63 of transparent material such as glass in order that the ellipsoidal reflector system 52 may be an enclosed system for preventing a stable clean internal environment with a beam outlet passing through pane 36 in small hole 50.

A similar construction using a shorter cylindrical container than the container 59 in the system 52 of FIG. 9 could be used to enclose the system of FIG. 8. Other embodiments presented herein could also be enclosed in like manner for closed stable clean internal environments. Some of the embodiments could employ explosive tubes or explosive cord along a distributed focus in such reflective systems in order to focus explosive shock waves to extremely high pressures and temperatures. While destructive of a reflective system in some instances the desired shock wave useful results are attained via the enclosed reflective systems employed. Some of these enclosed systems are immeresed in water that helps support the reflective shapes for the moment required with shock waves to provide the shock wave focus intensity desired.

The structure of FIG. 9 could be changed with a small ellipsoidal reflector section 64 provided in place of transparent pane 63 at the center end of primary ellipsoidal reflector 24'. In addition a small opening 65 (indicated in phantom) would be provided at the center of the secondary reflector 49 (or 51) and an opening 66 in end wall 61 (also indicated in phantom) both concentric with the ellipsoidal reflector system axis. A transparent material pane could be used in opening 65 or opening 66 so that the reflector system could be a closed system.

Whereas this invention has been described with respect to more than one embodiment thereof, it should be realized that various changes may be made without departing from the essential contributions to the art made by the teachings hereof.

I claim:

1. An ellipsoidal reflector radiant energy concentration system comprising:
    (1) A primary ellipsoidal reflector formed by rotating an ellipse about an axis of rotation angularly displaced from the major axis of said ellipse and crossing said major axis at one of the focii of said ellipse resulting in a configuration wherein the geometrical solid formed has a distributed (i.e. circular) focus for its first focus and a second focus remains a fixed point;
    (2) A secondary reflector of a configuration comprising first and second focal points one of which may be at infinity (i.e. parabola) wherein said radiant energy concentrated from said primary ellipsoidal reflector towards said second fixed focal point of said primary ellipsoidal reflector is reflected back through said second focal point of said secondary reflector resulting in a highly collimated beam of radiant energy.

2. The ellipsoidal reflector system of claim 1, wherein said structural means interconnecting said primary ellipsoidal reflector and said secondary reflector is a cylindrical enclosure fastened at one end to a rim of said primary ellipsoidal reflector; and with said cylindrical enclosure having an end wall mounting said secondary reflector.

3. The ellipsoidal reflector system of claim 1, wherein energy source means is in the form of a circle coexistent with said distributed focus.

4. The ellipsoidal reflector system of claim 3, wherein an opening is provided at the center end of said primary ellipsoidal reflector and with said major axis concentric with said opening.

5. The ellipsoidal reflector system of claim 3, wherein said energy souce means is an illumination tube of small tube diameter.

6. The ellipsoidal reflector system of claim 3, wherein said energy souce means is supported by pedestal means extended from the inner surface of said primary ellipsoidal reflector to said energy source means.

7. The ellipsoidal reflector system of claim 5, wherein said illumination tube is a circular gas discharge flash tube coexistent with said distributed focus.

8. The ellipsoidal reflector system of claim 6, wherein electric power leads are connected to said energy source means for the feeding of electric power to said energy source means from a power source.

9. The ellipsoidal reflector system of claim 4, wherein said opening is positioned to pass radiated energy reflected from said primary ellipsoidal reflector toward said second focal point and reflected back by said secondary reflector.

10. The ellipsoidal reflector system of claim 9, wherein said secondary reflector is an ellipsoid reflective section positioned to the opposite side of said second focal point from said primary ellipsoidal reflector.

11. The ellipsoidal reflector system of claim 10, wherein said secondary reflector is a hyperboloid reflector positioned between said second focal point and said primary ellipsoidal reflector in a Cassegrain compound reflective system.

12. The ellipsoidal reflective system of claim 4, wherein said opening is closed with a pane of radiation energy transparent material.

13. The ellipsoidal reflective system of claim 9, wherein a small ellipsoidal reflector section is provided at the center end of said primary ellipsoidal reflector; wtih said major axis concentric with said small ellipsoidal reflector section; and an opening is provided at the center of said secondary reflector concentric with said major axis.

* * * * *